United States Patent
Norimatsu

Patent Number: 5,438,612
Date of Patent: Aug. 1, 1995

[54] RADIO TELEPHONE APPARATUS HAVING CALL LIMITING FUNCTION

[75] Inventor: Noriko Norimatsu, Tokyo, Japan

[73] Assignee: NEC Corporation, Tokyo, Japan

[21] Appl. No.: 307,046

[22] Filed: Sep. 16, 1994

Related U.S. Application Data

[63] Continuation of Ser. No. 935,263, Aug. 27, 1992, abandoned.

[30] Foreign Application Priority Data

Sep. 6, 1991 [JP] Japan ................... 3-254478

[51] Int. Cl.⁶ ............. H04M 11/00; H04M 3/00; H04M 15/00
[52] U.S. Cl. ..................... 379/58; 379/111; 379/131; 379/192
[58] Field of Search ............ 377/58, 91, 111, 131, 377/130, 144, 190, 143, 357, 128, 192, 200; 455/2

[56] References Cited

U.S. PATENT DOCUMENTS

| | | | |
|---|---|---|---|
| 4,794,642 | 12/1988 | Arbabzadah et al. | 379/144 |
| 4,924,499 | 5/1990 | Serby | 379/200 |
| 4,951,308 | 8/1990 | Bishop et al. | 379/144 |
| 5,212,810 | 5/1993 | Maeda et al. | 455/58.2 |

FOREIGN PATENT DOCUMENTS

0208948 8/1989 Japan .................. 379/190

Primary Examiner—Curtis Kuntz
Assistant Examiner—Michael B. Chernoff
Attorney, Agent, or Firm—Foley & Lardner

[57] ABSTRACT

A radio telephone apparatus having a time specifying unit, a time measuring unit, a call controller, and an auxiliary power supply. The time measuring unit measures an elapsed period of time to detect the lapse of a specified period of time previously inputted to the time specifying unit. When it is found, as a result of the measurement, that the specified period of time has elapsed, the call controller limits call origination. Also, when the main power supply is off, the time specifying unit and the time measuring unit are powered from the auxiliary power supply, thereby measuring the lapse of time regardless of the on or off state of the main power supply. Consequently, call origination can be limited according to the lapse of a specified period of time or the arrival of a specified point in time.

14 Claims, 8 Drawing Sheets

RADIO TELEPHONE APPARATUS HAVING CALL LIMITING FUNCTION

This application is a continuation of application Ser. No. 07/935,263, filed Aug. 27, 1992, now abandoned.

BACKGROUND OF THE INVENTION

The present invention relates to a portable radio telephone apparatus having a call limiting function.

DESCRIPTION OF THE RELATED ART

Firms and companies are renting out portable radio telephone sets to users. Since the user can conveniently rent such a telephone set at a low price, the need for these rental telephone sets has been increasing year after year.

In such rental telephones, it has been common to limit usage by incorporating a call limiting function. Thus, when a preset condition is met, call initiation is restricted. For example, the restriction may limit the user to placing calls to particular telephone numbers, or the user may be prohibited from calling any telephone number after a preset time expires.

Heretofore, when emplacing call limitations with respect to time, there have been adopted limits on the total call time and limits on call frequency, as demonstrated by the following example.

In a rental telephone set, an upper time limit is set for the maximum period of time allowed for calling use. Namely, when the total time period reaches the upper-limit value, calling is restricted.

On the other hand, the upper frequency limit can be established such that when the total number of calls equals the upper limit, calling is restricted.

Conventionally, telephone sets have been rented under these two call conditions. However, for users who successively rent telephones for a fixed period of time, the above call limiting criteria can be inappropriate or uncomfortable.

Specifically, the maximum values of call time and frequency cannot be easily set in accordance with the customer's telephone usage requirements, which consequently causes a problem for the users. This is because variably setting the limits for each customer is difficult. A case may occur where, before the completion of a contracted period, calls may be inhibited due to the limitation of call time or frequency. On the other hand, there exists a problem for the rental company, namely, if call time and frequency limits are set at a level greater than the user needs the rented telephone may possibly be operated for a call after the contracted period has expired.

SUMMARY OF THE INVENTION

It is therefore an object of the present invention to provide a portable telephone apparatus having a call limiting function capable of limiting or inhibiting calls on the basis of a rental period, namely, an elapsed time period or an expiration time for the rented telephone set.

In order to achieve the above object, according to the present invention, there is provided a radio telephone apparatus having a call limiting function comprising time specifying means for specifying a predetermined period of time beforehand inputted thereto, time measuring means for measuring a lapse of the period of time specified by the time specifying means, call control means for limiting a call according to the lapse of the specified time period which is measured by the time measuring means and auxiliary power supply means for supplying power to the time specifying means and the time measuring means. The time measuring means measures, in response to the power supplied from the auxiliary power supply means, the lapse of the period of time specified in a continuous manner, whether the main power supply is in the on mode or the off mode.

Moreover, a radio telephone apparatus having a call limiting function according to the present invention comprises time specifying means for specifying a predetermined expiration time beforehand inputted thereto, current time measuring means for measuring a current time, call limiting means for limiting call origination when the current time measured by the current time measuring means equals the specified point of time, namely, the expiration time and the auxiliary power supply means for supplying power to the time specifying means and the current time measuring means. The current time measuring means measures, in response to a reception of the power supplied from the auxiliary power supply means, the current time in a continuous manner during whether the main power supply is in the active mode or the inactive mode.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Referring now to the drawings, a description will be given of embodiments of the radio telephone set having a call limiting function in accordance with the present invention.

Figure 1:
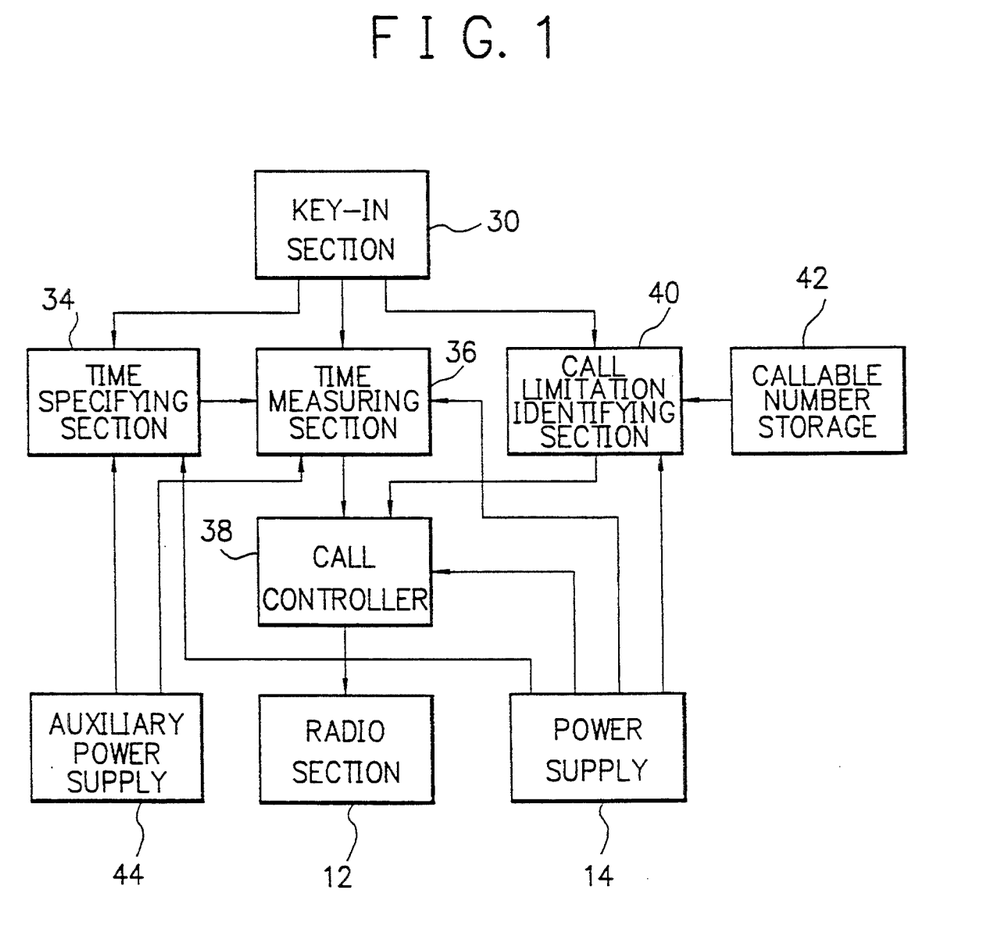
FIG. 1 is a block diagram schematically showing a portable radio telephone set having a call limiting function in an embodiment according to the present invention.

FIG. 1 shows an embodiment of the portable radio telephone set having a call limiting function in accordance with the present invention. The apparatus includes a key-in section 30 for inputting information. For example, via the key-in section 30, one could input a request for call initiation, a call limiting time period, and an instruction for count initiation. The call limiting time period supplied from the key-in section 30 is set and stored in a time specifying section 34. A time measuring section 36 starts counting time upon receiving the instruction for the count initiation from the key-in section 30. It will continue counting until the measured time matches the period of time stored in the time specifying section 34. When the time counted by the time measuring section 36 matches the time stored in the time specifying section 34, a call controller 38 restricts the call initiation thereafter. Alternatively, the call controller 38 can send the call request via a radio section 12 to a base station, not shown.

A call limitation identifying section 40 checks whether or not the call request inputted from the key-in section 30 is acceptable by referencing call numbers which are stored in a callable number storage 42 to limit the call initiation accordingly. In this section 40, although not shown, the frequency of calls may be counted so as to restrict calls when the total number of calls reaches the value stored in the storage 42.

A main power supply 14 delivers power to the respective sections of the apparatus. An auxiliary power supply 44 is operative, when the main power supply 14 is off, for supplying power to the time specifying section 34, the time measuring section 36, and the call controller 38.

Figure 2:
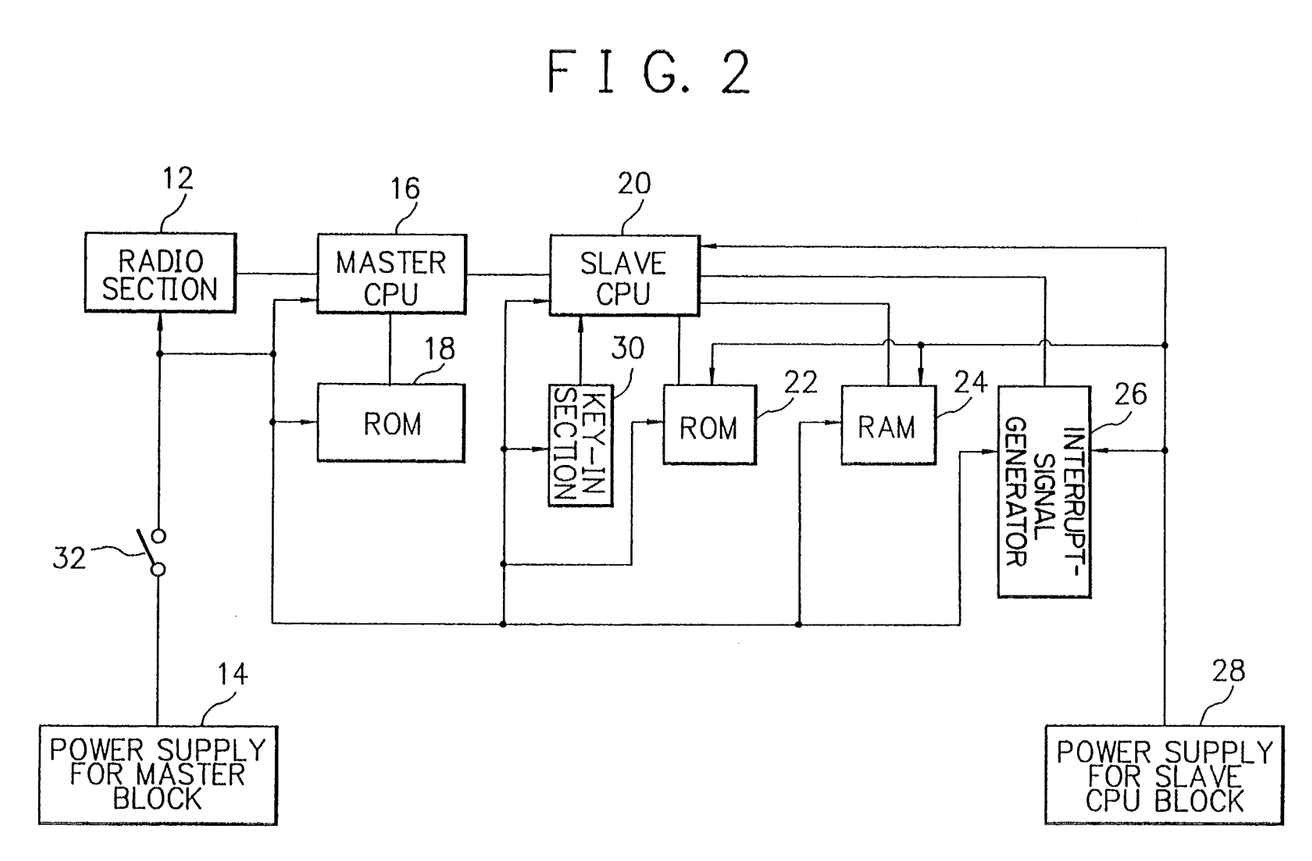
FIG. 2 is a block diagram showing the configuration of the primary portion of the telephone set of FIG. 1.

FIG. 2 specifically shows the constitution of the primary portion of the apparatus of FIG. 1. The configuration includes a radio section 12, a main power supply 14, a master CPU 16, a read-only memory (ROM) 18 loaded with a control procedure of the master CPU 16, a slave CPU 20, a ROM 22 loaded with a control procedure of the master CPU 20, a random access memory (RAM) 24 for the slave CPU 20, an interrupt-signal generator circuit 26 for issuing an interrupt signal to the slave CPU 20 at a fixed point in time, a power supply 28 for slave CPU 20, a key-in section 30, and a power switch 32.

Correspondence between FIG. 2 and FIG. 1 is as follows: the RAM 24 of FIG. 2 corresponds to the time specifying section 34 of FIG. 1; the slave CPU 20 and interrupt-signal generator circuit 26 of FIG. 2 correspond to the time measuring section 36 of FIG. 1; the master CPU 16 and slave CPU 20 of FIG. 2 correspond to the call controller 38 of FIG. 1; the master CPU 16 of FIG. 2 corresponds to the call limitation identifier 40 of FIG. 1; the RAM 24 of FIG. 2 corresponds to the callable number storage 42 of FIG. 1; and the power supply 28 for slave CPU 20 of FIG. 2 corresponds to the auxiliary power supply 44 of FIG. 1.

In the constitution of FIG. 2, the power supply 14 feeds power to the respective components in association with the operation of the power switch 32. When the power switch 32 is turned on, power is appropriately supplied to the radio section 12, the master CPU 16, the ROM 18, the slave CPU 20, the ROM 22, the RAM 24, the interrupt-signal generator circuit 26, and key-in section 30. When the switch 32 is turned off, the power supply is interrupted.

On the other hand, the power supply 28 for slave CPU 20 continuously supplies power, even when the power switch 32 is off, to the slave CPU 20, the ROM 22, the RAM 24, and the interrupt-signal generator circuit 26 so as to maintain these sections in the operable state.

The master CPU 16 conducts the primary control operation for the basic functions of the wireless telephone set by executing the control procedure stored in the ROM 18. The master CPU 16 also executes processing relating to call limitation.

Figure 4:
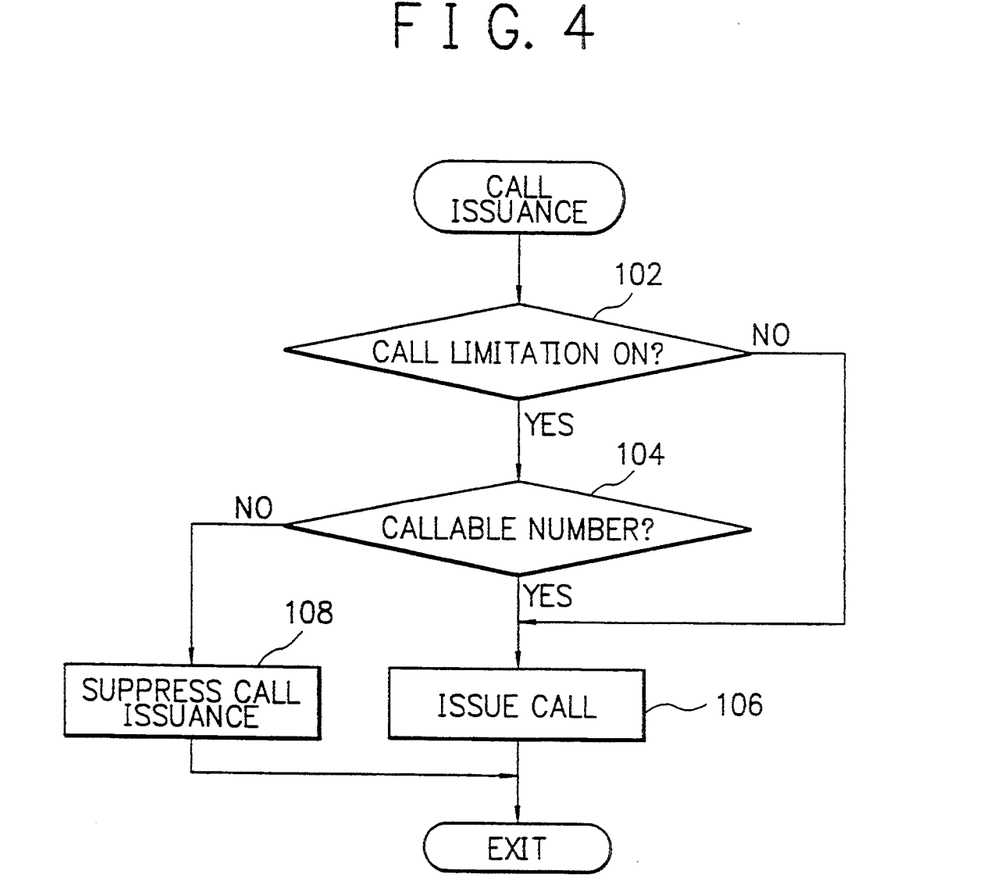
FIG. 4 is a flowchart showing an example of processing at a time of call initiation from a master central processing unit (CPU) block of FIG. 3.

FIG. 4 is a flowchart of an example of processing accomplished to initiate a call by the master CPU 16. However, the flowchart is missing the procedure of limiting calls according to the specified period of time or the specified point of time (expiration time), which is a feature of the present invention.

When a call is initiated from the key-in section 30, data related thereto is inputted via the slave CPU 20 to the master CPU 16. The master CPU 16 checks to determine whether or not the call limitation function is active (step 102). This is achieved, for example, by confirming via the slave CPU 20 whether or not the call limitation flag in the RAM 24 is active.

When the call limitation flag is inactive, call initiation is allowed. Consequently, the master CPU 16 proceeds to a step 106 to transmit the pertinent call request via the radio section 12 to a base station, not shown.

On the other hand, when the call limitation flag is active, which means that the call is restricted, the destination telephone number is checked to determine whether or not that number matches one of the callable numbers previously registered to the system (step 104). The callable number check can be carried out, for example, by referencing via the slave CPU 20 the callable telephone numbers previously stored in the RAM 24.

If the telephone number is found in the stored list of callable telephone numbers, the master CPU 16 proceeds to the step 106 to issue the call containing the telephone number. Otherwise, the processing goes to a step 108 to terminate the processing without issuing the call.

The call initiation processing explained above will be further described by referring to FIG. 1. When a call request is inputted from the key-in section 30, the call controller 38 checks to determine whether or not the call limitation flag is in the active state. If the call limitation flag is in the inactive state, the call request is transmitted via the radio section 12. Otherwise, the call limitation identifying section 40 determines whether or not the telephone number of the communicating partner has already been registered in the callable number storage 42. Depending on this determination, the call is initiated or the call origination is suppressed, thereby completing the processing.

Subsequently, the feature of the present invention, that is to say, the operation of call limiting after a predetermined time period, as described above, will be detailed.

Figure 5:
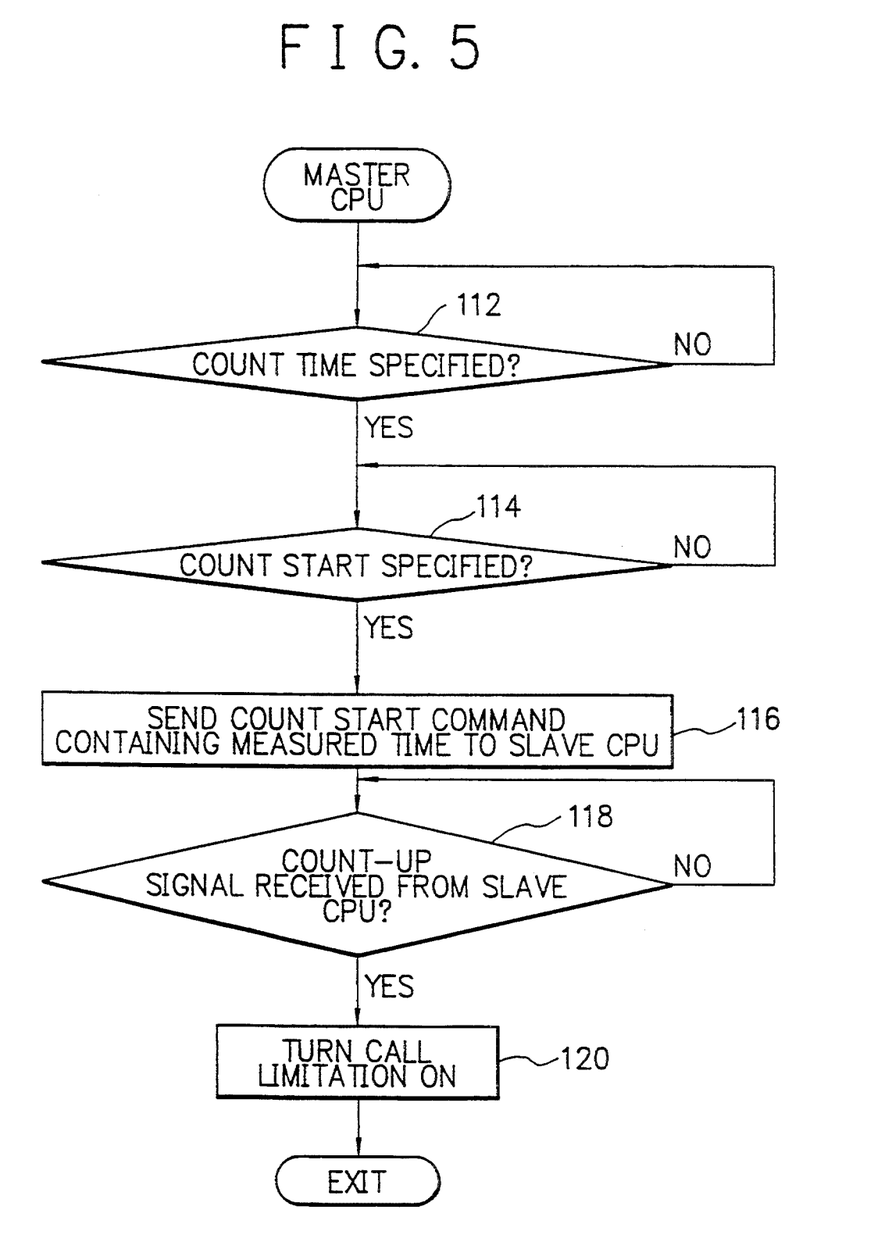
FIG. 5 is a flowchart showing an example of processing achieved by the CPU block of FIG. 3.
Figure 6:
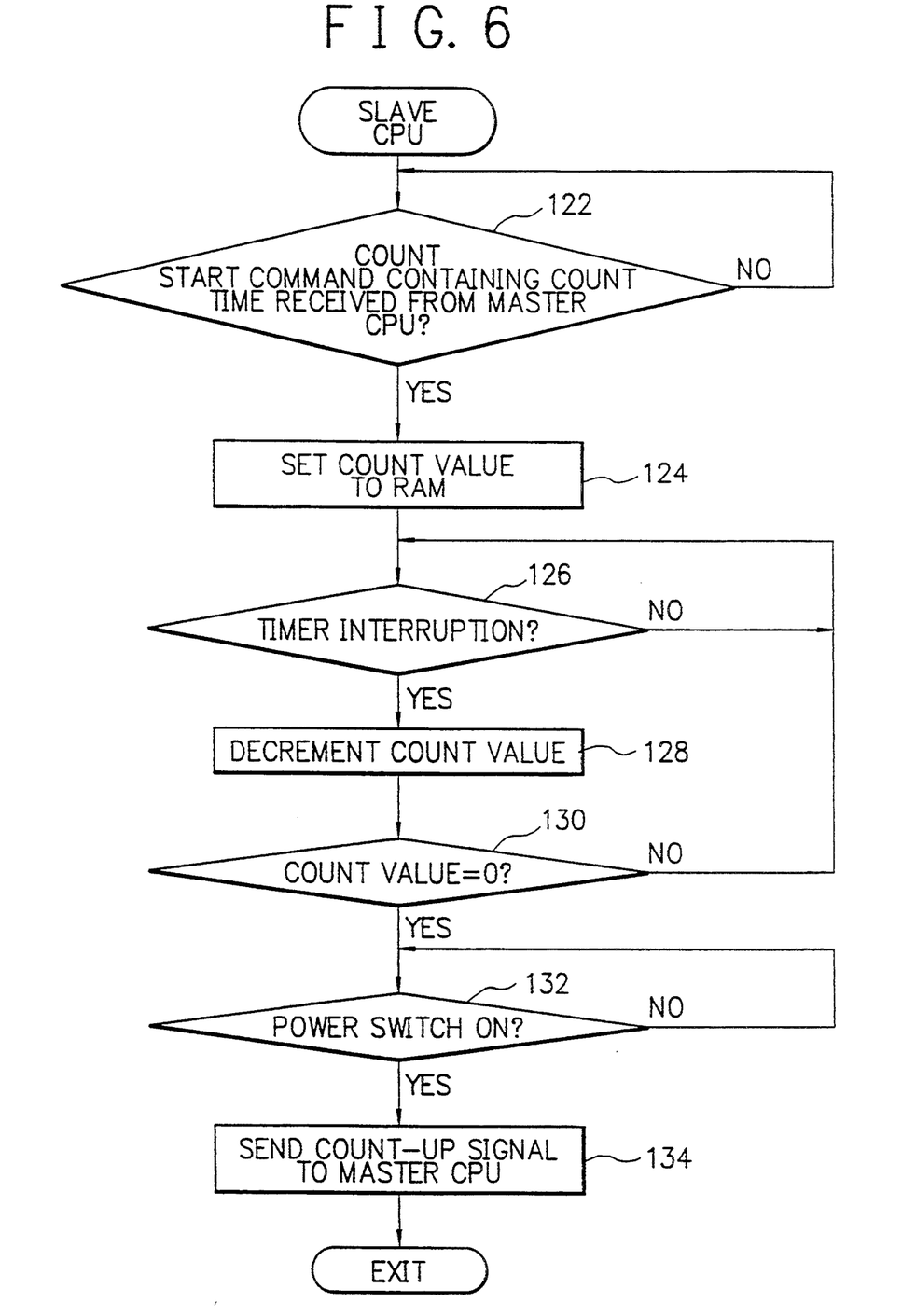
FIG. 6 is a flowchart showing an example of processing conducted by a slave CPU block of FIG. 3.

FIG. 5 is a flowchart showing an example of processing executed by the master CPU 16 in accordance with the control procedure which is stored in the ROM 18 of the embodiment shown in FIG. 2. FIG. 6 is a flowchart showing an example of processing executed by the slave CPU 20 according to the control procedure stored in the ROM 22 of the embodiment.

In a case where it is desired to restrict call initiation, the operator of the company renting the telephone set inputs, from the key-in section 30, a value associated with a period of time (for example, the number of days) for the call limitation function. Then, the inputted data is sent via the slave CPU 20 to the master CPU 16 so as to establish a count time specification therein (step 112).

Next, when a count start command or request is inputted from the key-in section 30, the specified data is similarly sent via the slave CPU 20 to the master CPU 16, thereby specifying the count initiation (step 114).

On receiving the count time value and the count start command, the master CPU 16 transmits the received data items to the slave CPU 20 (step 116).

In the flowchart of FIG. 6, on receiving the count time value and the count start command from the master CPU 16 (step 122), the slave CPU 20 sets in the RAM 24 a count value corresponding to the received count time data (step 124). Thereafter, each time an interrupt-signal from the interrupt-signal generator 26 is received at the slave CPU 20 (step 126), the slave CPU 20 decrements the count value stored in the RAM 24 (step 128).

The above operation thus establishes the time period for the call limiting function and initiates measurement of the elapsed time. The telephone to be rented to the user is thus prepared for call limitation.

As above, since the slave CPU 20, the ROM 22, the RAM 24 and the interrupt-signal generator circuit 26 are supplied with power from the power supply 28 for slave CPU 20 even when the power switch 32 is off, the slave CPU 20 conducts the processing shown in FIG. 6. regardless of the on or off state of the power switch 32.

As a result, regardless of the active or inactive state of the power switch 32, when the inputted time period has elapsed from the time the telephone is rented, the count value in the RAM 24 is reset to 0. On detecting the count value set to 0 (step 130), the slave CPU 20 checks the state of the power switch 32 (step 132) to immediately deliver a count-up signal to the master CPU 16 if the power switch 32 is on (step 134).

In the step 132, if the power switch 32 is found to be off, a wait loop is initiated to await the active state of the power switch 32 (step 132). When the power switch 32 is turned on, the slave CPU 20 sends a count-up signal to the master CPU 16 which is now powered to the operable state (step 134).

Returning to the flowchart of FIG. 5, on receiving the count-up signal from the slave CPU 20 as seen in the step 118, the master CPU 16 sets the call limiting function to the on state (step 120). Through the operation above, the call limitation function is achieved as described by reference to the flowchart of FIG. 4.

The processing above will now be described by referring to the configuration of FIG. 1. When a call limitation time is specified and inputted from the key-in section 30, a count time associated with the specified time period is fed to the time specifying section 34 to be stored therein. The time measuring section 36 continuously counts until the period of time specified by the time specifying section 34 is elapsed. When the time measuring section 36 recognizes the lapse of the specified period of time, the call controller 38 assumes the call limitation flag to be in the active state and hence terminates the processing without issuing the call.

Figure 3:
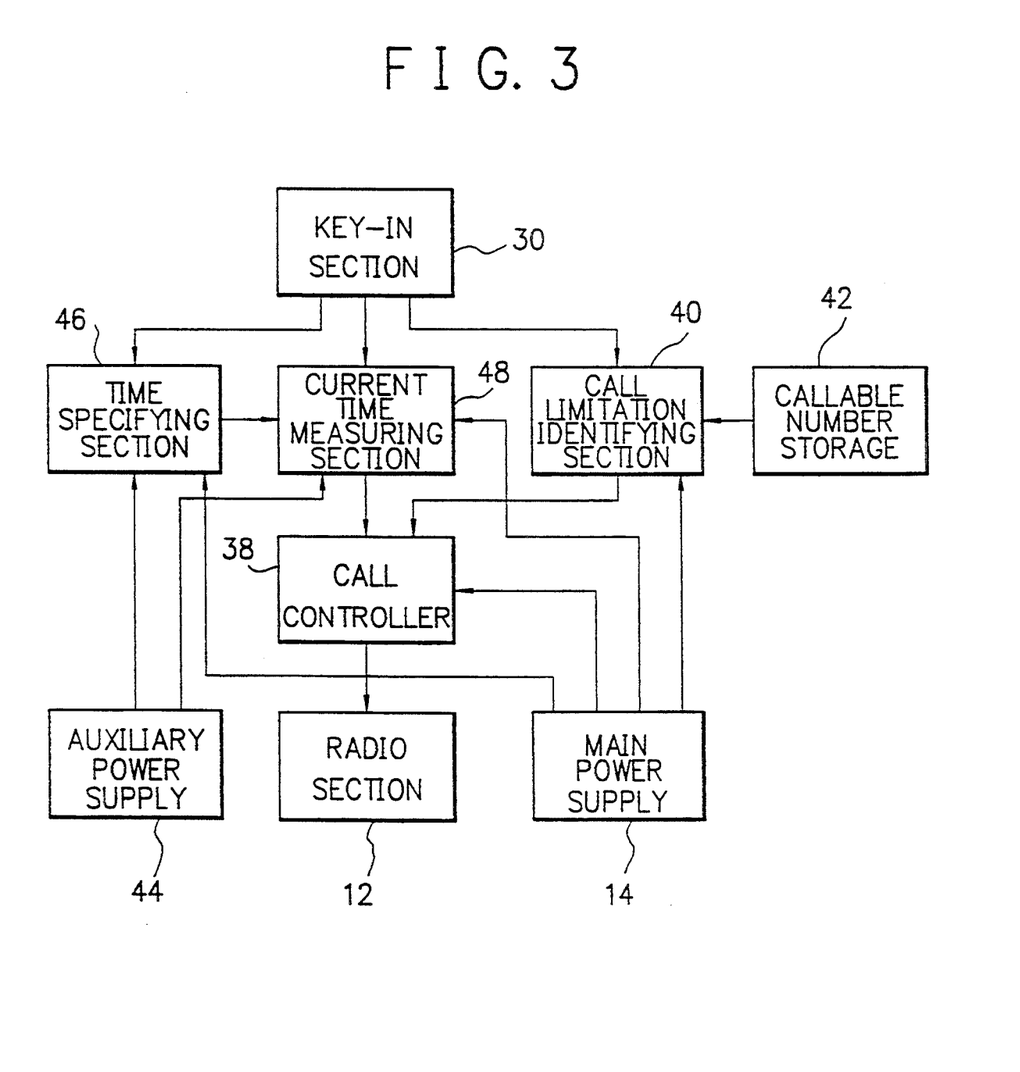
FIG. 3 is a block diagram schematically showing a portable radio telephone set having a call limiting function in an alternative embodiment according to the present invention.

FIG. 3 shows an alternative embodiment of the radio telephone apparatus having a call limiting function in accordance with the present invention. In this apparatus, in place of the time specifying section 34 and the time measuring section 36 of FIG. 1, there are disposed a time specifying section 46 and a current time measuring section 48. The expiration time at which the call request should be restricted is supplied from the key input section 30 to the time specifying section 46. The current time measuring section 48 measures the current time and makes a check to determine whether the current time is equal to the expiration time loaded in the time specifying section 46. The call controller 38 determines whether or not the call limiting function is in the active state depending on a signal from the current time measuring section 48. The other components and their operations are substantially identical to those of FIG. 1 and hence description thereof will be avoided. In addition, a specific constitution of this telephone set is almost the same as that of the apparatus shown in FIG. 2.

Figure 7:
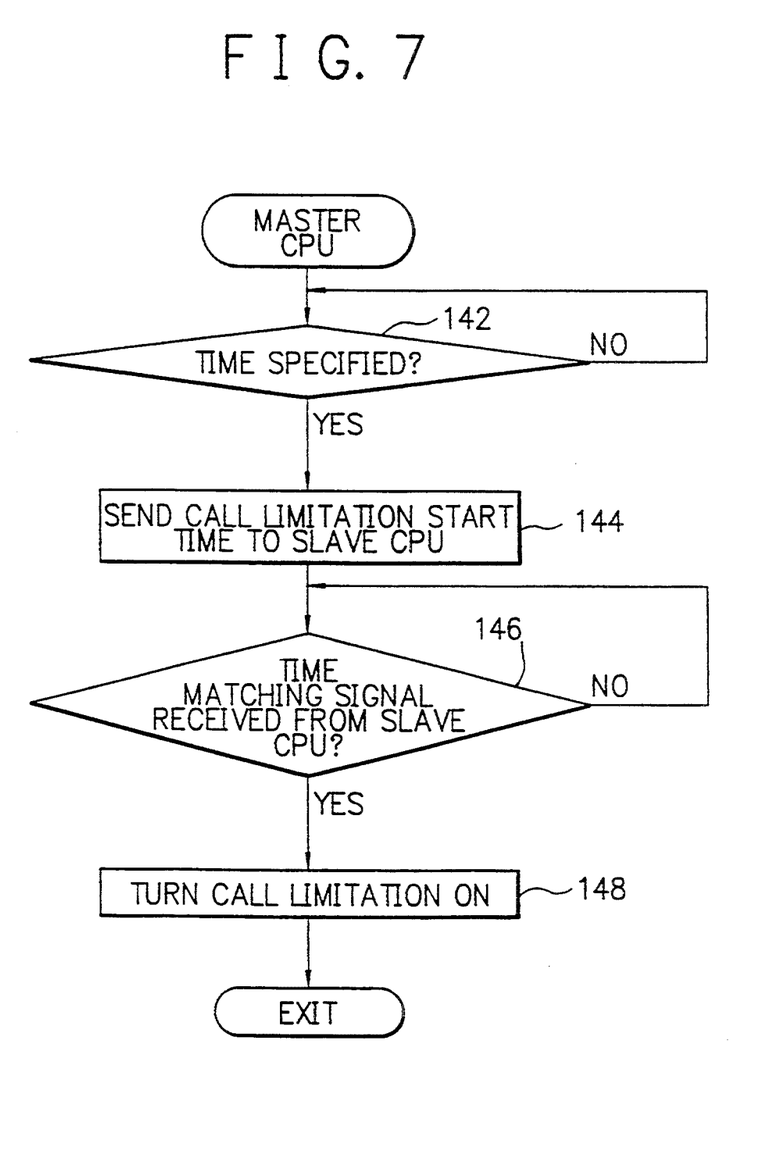
FIG. 7 is a flowchart showing another example of processing achieved by the CPU block of FIG. 3.
Figure 8:
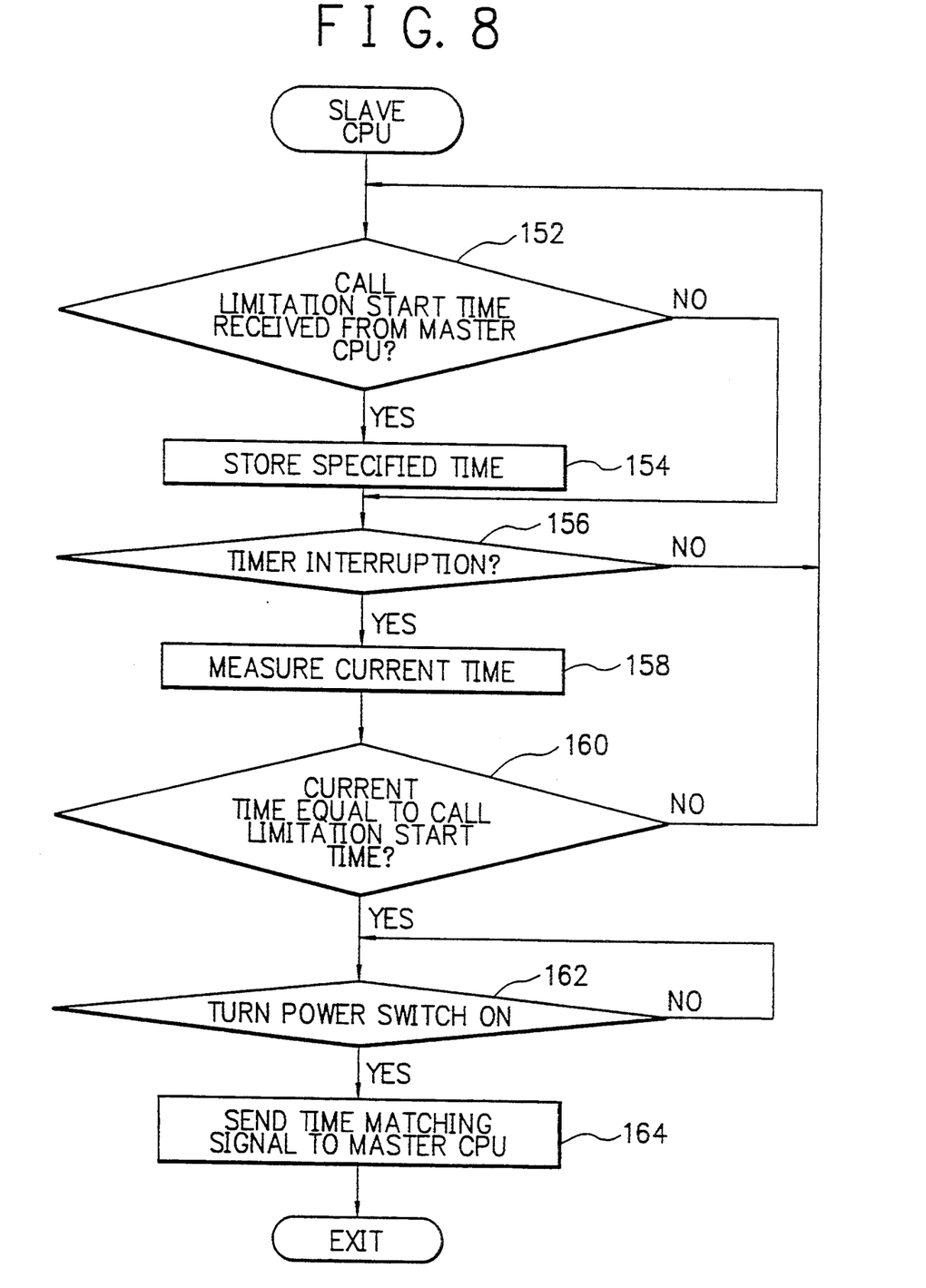
FIG. 8 is a flowchart showing another example of processing conducted by the slave CPU block of FIG. 3.

FIG. 7 is a flowchart showing an example of processing accomplished by the master CPU 16 in accordance with the control procedure stored in the ROM 18, whereas FIG. 8 is a flowchart showing an example of processing carried out by the slave CPU 20 based on the control procedure stored in the ROM 22.

To restrict call origination from a rental telephone at a contracted usage termination (call limitation start) time, the operator of the company renting the telephone inputs the call limitation start time, namely the expiration time (for example, information of date as "month, day, hour") from the input section 30. The supplied data is sent, via the slave CPU 20, to the master CPU 16. On receiving the data, the master CPU 16 recognizes the specification of the call limiting time (step 142) and then retransmits the data of call limiting time to the slave CPU 20 (step 144).

In FIG. 8, on receiving the call limitation start time sent from the master CPU 16 (step 152), the slave CPU 20 stores the received data in the RAM 24 (step 154).

As a result of the operation above, the expiration time is established in the rental telephone. Namely, the telephone is rented in this state to the user at the contracted start time of the telephone.

In this regard, the slave CPU 20 continuously executes the processing shown in FIG. 8 irrespective of the on or off state of the power switch 32. Each time an interruption signal is received at a fixed interval of time from the interrupt-signal generator circuit 26, the slave CPU 20 increments the count of the current time in the RAM 24, thereby updating the current time (steps 156 and 158).

After the telephone apparatus is rented, when the call limitation time thus established arrives and hence becomes equal to the current time, the slave CPU 20 detects the matching of time (step 160) and checks the state of the power switch 32. If the switch 32 is on, the slave CPU 20 immediately transmits a time coincidence or matching signal to the master CPU 16 (step 164); otherwise, a wait loop is initiated to await the active state of the power switch 32 (step 162). When the power switch 32 is turned on, the time matching signal is sent to the master CPU 16 (step 164).

Returning to the flowchart of FIG. 7, on receiving the time coincidence signal from the slave CPU 20 (step 146), the master CPU 16 sets the call limitation function to the active state (step 148). Through the operation above, call initiation is restricted as described in conjunction with the flowchart of FIG. 4.

Description will now be given of the processing above by reference to the configuration of FIG. 3. When a call limitation time is supplied from the key-in section 30, the specified expiration time is sent to the time specifying section 46 to be stored therein. The current time measuring section 48 continuously measures time until the time stored in the time specifying section 46 arrives. When the section 48 recognizes the arrival of the specified time, the call controller assumes the call limitation function to be in the active state and hence terminates the processing without originating the call.

As above, in the radio telephone set in accordance with the present invention, there are disposed means for measuring the period of elapsed time or means for measuring the current time. Consequently, even when the main power supply is off, which often occurs in the operation of the telephone apparatus, the lapse of time or the current time is continuously measured by the above means, thereby restricting call initiation when the preset period of time has elapsed or when the predetermined point of time arrives. This leads to an advantageous effect that call origination can be limited on the basis of the rental period in the service activities of the companies renting radio telephone sets as well as in the handling of rental telephone sets on a personal basis.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A radio telephone apparatus having a call limiting function, comprising:

a memory means for storing therein a list of callable numbers, a set of programmed procedures including a first procedure for receiving a set of time data, a second procedure for specifying a call limiting time period according to said set of time data, a third procedure for receiving a measurement start command, a fourth procedure for continuously measuring a lapse of said call limiting time period with said start command given, a fifth procedure for rendering said call limiting function active after said call limiting time period has elapsed, a sixth procedure for prohibiting entering said fifth procedure, a seventh procedure for receiving a request for call issuance containing a destination number, an eighth procedure for searching said callable numbers for matching one of said callable numbers to said destination number, a ninth procedure for rendering said call limiting function active when said matching callable number is not found, a tenth procedure for prohibiting entering said ninth procedure, an eleventh procedure for establishing a programmed combination of said fifth, said sixth, said ninth and said tenth procedures, and a twelfth procedure for allowing a request for said call limiting function held inactive as normal;

a radio means for issuing a call when said request is allowed;

a CPU means for reading said callable numbers, said programmed procedures and executing said programmed procedures including a thirteenth procedure for operating said memory means and a fourteenth procedure for operating said radio means; and a power supply means for supplying power to said memory means, said radio means and said CPU means.

2. A radio telephone apparatus as claimed in claim 1, wherein:

said CPU means comprises a first CPU means for executing said first procedure for receiving said set of time data, said second procedure for specifying said call limiting time period, said third procedure for receiving said measurement start command, said fifth procedure for rendering active said call limiting function after said time period has elapsed, said sixth procedure for prohibiting entering said fifth procedure, said seventh procedure for receiving said request for call issuance, said ninth procedure for rendering active said call limiting function when said matching callable number is not found, said tenth procedure for prohibiting entering said ninth procedure, said eleventh procedure for establishing said programmed combination, said twelfth procedure for allowing said request for said call limiting function, said thirteenth procedure for operating said memory means, and said fourteenth procedure for operating said radio means, and a second CPU means for executing said fourth procedure for continuously measuring the lapse of said call limiting time period, said eighth procedure for searching said callable numbers, and said thirteenth procedure for operating said memory means.

3. A radio telephone apparatus as claimed in claim 2, wherein:

said first CPU means transfers specified data of said call limiting time period and said start command to said second CPU means;

said second CPU means sets a count value according to said specified data, responds to said start command to start counting by decrementing said count value at intervals of a preset time in said fourth procedure for measuring the lapse of said call limiting time period, and transfers a count-up signal to said first CPU means upon completion of said counting; and said first CPU means responds to said count-up signal to execute said fifth procedure for rendering active said call limiting function.

4. A radio telephone apparatus as claimed in claim 3, wherein:

said second CPU means has an interrupt-signal generator circuit for generating an interrupt signal at intervals of said preset time, and responds to said interrupt signal to decrement said count value.

5. A radio telephone apparatus as claimed in claim 2, wherein:

said memory means comprises a first memory for storing therein each of said procedures that said first CPU means executes, and a second memory for storing therein said callable numbers and each of said procedures that said second CPU means executes; and said power supply means comprises a first power supply for supplying power to said first CPU means, said first memory and said radio means through a manually operable power interruption switch, and a second power supply for supplying power to at least said second CPU means and said second memory.

6. A radio telephone apparatus as claimed in claim 5, wherein:

said first power supply also supplies power to said second CPU means and said second memory through said power interruption switch; and said second CPU means executes said fourth procedure for measuring the lapse of said call limiting time period irrespective of the operated state of said power interruption switch.

7. A radio telephone apparatus as claimed in claim 1, wherein:

said programmed combination has said sixth and said tenth procedures selected and prohibits entering said fifth and said ninth procedures, thereby allowing said request for call issuance for said matching callable number after said call limiting time period has elapsed.

8. A radio telephone apparatus having a call limiting function, comprising:

a memory means for storing therein a list of callable numbers, a set of programmed procedures including a first procedure for receiving a set of time data, a second procedure for specifying an expiration time according to said time data, a third procedure for continuously measuring the current time, a fourth procedure for rendering said call limiting function active at a measured current time equal to said expiration time, a fifth procedure for prohibiting entering said fourth procedure, a sixth procedure for receiving a request for call issuance containing a destination number, a seventh procedure for searching said callable numbers for matching one of said callable numbers to said destination number, an eighth procedure for rendering said call limiting function active when said matching callable number is not found, a ninth procedure for prohibiting said eighth procedure, a tenth procedure for establishing a programmed combination of said fourth, said fifth, said eighth and said ninth procedures, and an eleventh procedure for allowing a request for said call limiting function held inactive as normal;

a radio means for issuing a call with said request allowed;

a CPU means for reading said callable numbers, said programmed procedures and executing said programmed procedures including a twelfth procedure for operating said memory means and a thirteenth procedure for operating said radio means; and a power supply means for supplying power to said memory means, said radio means and said CPU means.

9. A radio telephone apparatus as claimed in claim 8, wherein:

said CPU means comprises a first CPU means for executing said first procedure for receiving said set of time data, said second procedure for specifying said expiration time, said fourth procedure for rendering active said call limiting function at said measured current time equal to said expiration time, said fifth procedure for prohibiting entering said fourth procedure, said sixth procedure for receiving said request for call issuance, said eighth procedure for rendering active said call limiting function when said matching callable number is not found, said ninth procedure for prohibiting entering said eighth procedure, said tenth procedure for establishing said programmed combination, said eleventh procedure for allowing said request, said twelfth procedure for operating said memory means, and said thirteenth procedure for operating said radio means, and a second CPU means for executing said third procedure for measuring the current time, said seventh procedure for searching said callable numbers, and said twelfth procedure for operating said memory means.

10. A radio telephone apparatus as claimed in claim 9, wherein:

said first CPU means transfers specified data of said expiration time to said second CPU means;

said second CPU means processes said specified data to establish therein said expiration time, and transfers a time coincidence signal to said first CPU means at said measured current time equal to said expiration time; and said first CPU means responds to said time coincidence signal to execute said fourth procedure for rendering active said limiting function.

11. A radio telephone apparatus as claimed in claim 10, wherein:

said second CPU means has a measured current time updated as the current time is measured in said third procedure, is provided with an interrupt-signal generator circuit for generating an interrupt signal at intervals of a preset time, and responds to said interrupt signal to incrementingly update said measured current time in accordance therewith.

12. A radio telephone apparatus as claimed in claim 9, wherein:

said memory means comprises a first memory for storing therein each of said procedures said first CPU means executes, and a second memory for storing therein said callable numbers and each of said procedures that said second CPU means executes; and said power supply means comprises a first power supply for supplying power at least to said first CPU means, said first memory and said radio means through a manually operable interruption switch, and a second power supply for supplying power to at least said second CPU means and said second memory.

13. A radio telephone apparatus as claimed in claim 12, wherein:

said first power supply also supplies power to said second CPU means and said second memory through said interruption switch; and said second CPU means executes said third procedure for measuring the current time irrespective of the operated state of said interruption switch.

14. A radio telephone apparatus as claimed in claim 8, wherein:

said programmed combination has said fifth and said ninth procedures selected and prohibits entering said fourth and said eighth procedures, thereby allowing said request for call issuance for said matching callable number after said expiration time.

* * * * *